United States Patent
Burchard et al.

(10) Patent No.: US 6,826,533 B2
(45) Date of Patent: Nov. 30, 2004

(54) SPEECH RECOGNITION APPARATUS AND METHOD

(75) Inventors: Bernd Burchard, Essen (DE); Tobias Schneider, München (DE); Thomas Volk, München (DE); Jean-Philippe Fournier, München (DE)

(73) Assignee: Micronas GmbH, Freiburg (DE)

( * ) Notice: Subject to any disclaimer, the term of this patent is extended or adjusted under 35 U.S.C. 154(b) by 224 days.

(21) Appl. No.: 09/822,778

(22) Filed: Mar. 30, 2001

(65) Prior Publication Data

US 2002/0049596 A1 Apr. 25, 2002

(30) Foreign Application Priority Data

Mar. 30, 2000 (DE) ......................................... 100 15 960

(51) Int. Cl.[7] ............................................. G10L 15/00
(52) U.S. Cl. ..................................... 704/270; 704/275
(58) Field of Search ............................... 704/270, 275, 704/241, 251

(56) References Cited

U.S. PATENT DOCUMENTS

| | | | |
|---|---|---|---|
| 4,866,778 A | 9/1989 | Baker | ........................ 381/43 |
| 5,191,532 A | 3/1993 | Moroto et al. | .............. 364/449 |
| 6,151,571 A | * 11/2000 | Pertrushin | ................... 704/209 |
| 6,230,132 B1 | 5/2001 | Class et al. | ................. 704/270 |
| 6,594,630 B1 | * 7/2003 | Zlokarnik et al. | .......... 704/256 |

FOREIGN PATENT DOCUMENTS

DE 40 29 716 C2 2/1998

* cited by examiner

*Primary Examiner*—Daniel Abebe
(74) *Attorney, Agent, or Firm*—Gauthier & Connors LLP

(57) ABSTRACT

To control an arbitrary system by speech recognition, it is proposed that speech recognition be implemented in the form of a predefined sequence of states, such that, upon recognition of an appropriate voice command, the system changes from one state to another state, and this change takes place in dependence on at least one speech recognition parameter. The speech recognition parameters can influence, for example, the so-called "false acceptance rate" (FAR) and/or the "false rejection rate" (FRR), which thus are set to state-specific values for the individual states, in order to achieve improved recognition accuracy.

15 Claims, 1 Drawing Sheet

SPEECH RECOGNITION APPARATUS AND METHOD

BACKGROUND OF THE INVENTION

The present invention relates to the field of speech recognition, and in particular to a technique for controlling the sensitivity of the speech recognition unit based upon the operating state/mode of the unit.

Voice-controlled systems are becoming popular with the advances in technology. Their advantage is that the person controlling the system is not required to make direct contact with the controlled device in order to control it.

Speech recognition is performed by appropriate speech recognition algorithms that access a dictionary database. The speech recognition algorithms are such that a voice command directed to the system being controlled can be distinguished from ambient noises and similar phonetic sequences.

A problem arises when phonetic sequences are erroneously recognized as a valid voice command. Such an erroneous detection of a voice command is often described by the "false acceptance rate" (FAR) (i.e., a false positive), which specifies how many phonetic sequences were erroneously recognized as a voice command. Therefore, the FAR value is a measure of acceptance sensitivity or acceptance threshold.

An additional problem with speech recognition systems is that a valid voice command may not be properly recognized. This erroneous rejection of valid voice commands is described by the "false rejection rate" (FRR), which is a measure of how many valid voice commands were not recognized by the speech recognition system. The FRR value is a measure of the rejection sensitivity or rejection threshold at which a valid voice command is not recognized.

When controlling a device by voice, without using an additional signal transducer, such as for example a sensor or switch, the system designer would like to simultaneously achieve the best possible FAR value and the best possible FRR value. Ideally, both of these error rates should be minimized.

However, on the basis of the speech recognition algorithm, these two error rates or sensitivities are often mutually exclusive. That is, an increasing FAR value is associated with a decreasing FRR value and vice versa, so that the two error rates cannot be simultaneously optimized. In the extreme case, no valid voice command is recognized (i.e., FAR=0%, FRR=100%), or all phonetic sequences are erroneously accepted as a valid voice command (i.e., FAR–100%, FRR=0%).

In conventional speech recognition systems "keyword spotting" (i.e., recognition of a keyword) is performed to mark the beginning of a command sequence that activates the actual speech recognition function of the particular voice-controlled system. After a keyword has been recognized, the speech recognition algorithm waits for a voice command to be input. Once a valid voice command is detected, the appropriate menu item or control parameter associated with the voice command is selected. For example, the detection of the voice command "loudness" causes the speech recognition system to select the menu item for setting the loudness, while the subsequent voice command "soft" can set the appropriate loudness parameter. The command sequence is terminated through the optional input of a suitable termination command, such as, for example "end".

However, the speech recognition algorithm can also recognize the end of the command sequence from the given and previously run-through menu scheme.

These speech recognition systems often include several system operating states. For example, in a first state the speech recognition system waits to recognize a keyword. After the keyword has been recognized, the system transitions to a second state and tests subsequent voice commands in order to select a menu item or to set a corresponding parameter associated with the voice command. In these individual states, the conventional speech recognition system utilizes a constant/static FAR value and FRR value. However, since neither the static FAR value nor the static FRR value is optimized, the system operation is often less than desirable.

Therefore, there is a need for a speech recognition system that more accurately recognizes speech.

SUMMARY OF THE INVENTION

Briefly, according to the present invention, a speech recognition unit includes a memory device that stores an executable speech recognition routine, and a processor that receives and executes program instructions associated with the executable speech recognition routine. In a first operating state the processor regularly receives a digitized audio signal and processes the digitized audio signal to determine, using first detection criteria, if a keyword is within the digitized audio signal, and upon detection of the keyword the processor transitions to operate in a second operating state. In the second operating state the processor regularly receives and processes the digitized audio signal to determine, using a second detection criteria, if a first voice command is within the digitized audio signal. The first detection criteria is selected to provide a greater false rejection rate than the second detection criteria.

Speech is recognized with state-specific speech recognition parameters, which are referred to as "scores". The speech recognition parameters thus are set to different values in the individual states so that, for example, the FAR value and the FRR value are influenced in a manner appropriately specific to the state. This procedure has the advantage that the speech recognition parameters can be optimized for each state.

It is especially advantageous for the FAR value to have a lower value in the state during which the system waits for input of the keyword, than it has in the other states. The acceptance threshold corresponding to the FAR value at which a phonetic sequence is recognized as a voice command is thus increased. Therefore, the user is required to speak the keyword clearly and to repeat it if necessary. Reducing the FAR value generally results in an increase of the FRR value (i.e., the probability that a valid voice command is not recognized is decreased).

After the keyword has been recognized, the FAR value can be increased and thus the acceptance threshold can be lowered. At the same time, the FRR value is decreased thus lowering the probability of an erroneous rejection of a voice command. This reduces the probability of erroneous execution of more complex voice commands and at the same time increases operating convenience.

Adjusting the speech recognition parameters as a function of the state utilizes the fact that the probability of recognizing a control word or a control command after the keyword has been recognized is close to 100%, since on occasions other than the initial state occurrence of the keyword is improbable.

A preferred application of the present invention is in the field of entertainment electronics. However, in principle the invention is suited for systems of arbitrary design, which are to be controlled by speech recognition. Furthermore, the invention is not limited to adjusting the FAR value and the FRR value, but can also be applied to dynamically adjusting other speech recognition parameters that are important for the speech recognition function.

These and other objects, features and advantages of the present invention will become more apparent in light of the following detailed description of preferred embodiments thereof, as illustrated in the accompanying drawings.

DETAILED DESCRIPTION OF THE INVENTION

Figure 2:
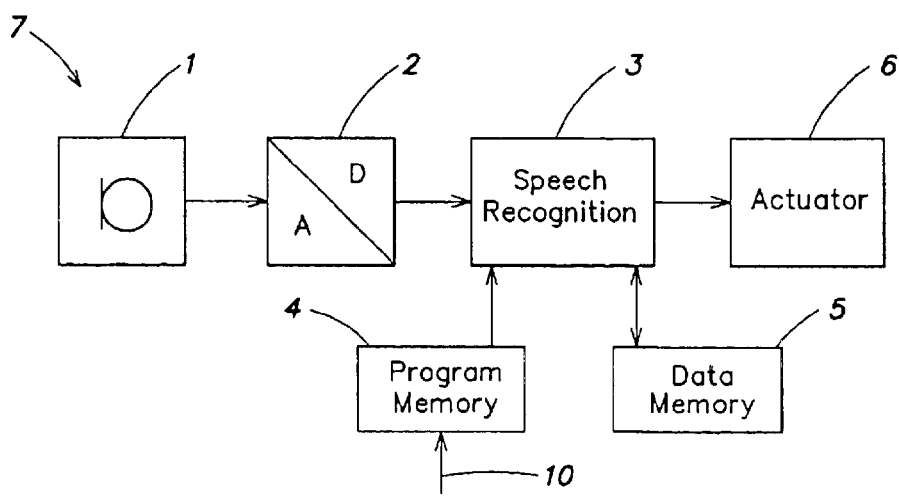
FIG. 2 is a simplified block diagram illustration a speech recognition system.

FIG. 2 is a simplified block diagram illustration of a speech recognition system that may be used in a voice-controlled television set or the like. The speech recognition system 7 includes a microphone or microphone array 1 that detects external audio signals. The detected audio signals are amplified by an amplifier (not shown), and digitized by an analog-to-digital converter 2. The digitized data stream is then conducted to a speech recognition unit 3, which executes a speech recognition algorithm to detect a user's voice commands contained in the digitized data stream. The executable speech recognition algorithm may be stored in a program memory 4, accessible by the speech recognition unit. The speech recognition unit 3 also communicates with a data memory 5 that is used for the intermediate storage of data (e.g., data coming from the analog-to-digital converter 2). Alternatively, the data memory may be implemented by a common memory together with the program memory 4.

The program memory 4 is connected to a programming interface 10, through which the stored speech recognition algorithm program can be changed. According to an aspect of the present invention, the speech recognition parameters used by the particular speech recognition algorithm can also be set via the programming interface. In particular, the FAR value and the FRR value can be set to desired values for each operational state of the speech detection system.

After recognition of a voice command, the voice command is converted by the speech recognition unit 3 into a corresponding control signal for a suitable actuator 6 or a suitable actuating element of the voice-controlled apparatus (for example a switch or control, etcetera) to produce the adjustment corresponding to the recognized voice command.

Figure 1:
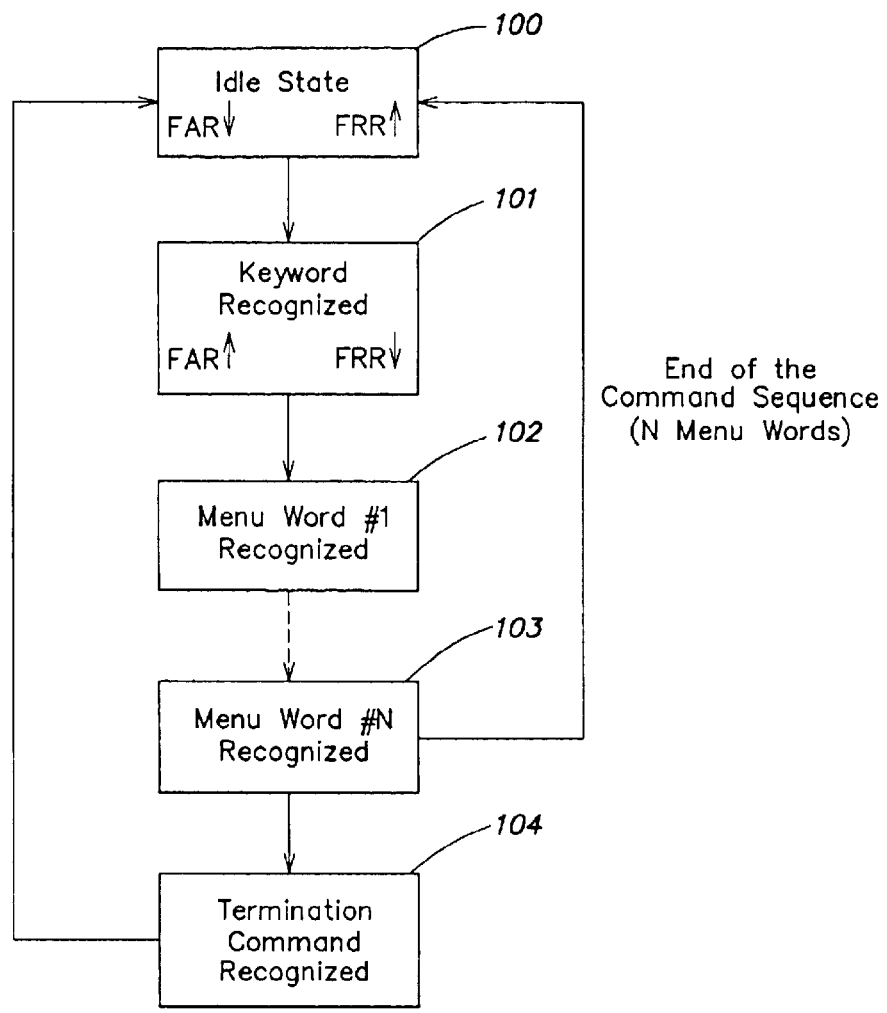
FIG. 1 is a state transition diagram of the speech recognition technique of the present invention.

The speech recognition unit 3 (FIG. 2) recognizes speech in accordance with the state diagram shown in FIG. 1. In an idle state 100, the speech recognition unit 3 waits for the appearance of a certain keyword. Recognition of the keyword causes self-activation of the speech recognition function. The keyword should be a term that does not occur in normal speech (e.g., "acoustic TV" for the voice control of a television set) to reduce the probability of incorrectly detecting the keyword.

In the idle state 100 the FAR value is set to a relatively low value (e.g., to a lower value than in the other states). Thus, the acceptance threshold corresponding to the FAR value at which a phonetic sequence is recognized as a voice command is increased. As a result, the user must speak the keyword clearly, and repeat it if necessary. Reducing the FAR value is generally associated with increasing the FRR value.

After the keyword has been recognized, the speech recognition system changes into operational state 101, in which the speech recognition unit 3 (FIG. 2) waits for the appearance of a voice command, through which a menu item is selected or a parameter of the voice-controlled device (e.g., volume) is set to a desired value.

In the following discussion, it will be assumed that until a control parameter is set a total of N voice commands or menu words must be entered.

After the first menu word has been recognized, the system changes to operational state 102. After recognizing the Nth menu word, through which the desired parameter is set to a preferred value, the speech recognition unit 3 (FIG. 2) is in operational state 103. This state 103 is not reached by the speech recognition unit 3 until both the keyword and all the N menu words have been recognized.

In the state 103, the speech recognition unit 3 knowing that the meaningful command sequence has length N, can recognize the end of this command sequence and can again automatically change into the idle state 100.

Alternatively, when the speech recognition unit 3 is in state 103, it can also wait for the occurrence of a suitable termination command, through which the user communicates the end of the command sequence. Recognition of this termination command causes the unit to change to an end state 104, following which the speech recognition unit 3 again returns to the idle state 100.

After the keyword has been recognized in state 100, the FAR value is increased and thus the value of the acceptance threshold can be decreased. At the same time, the FRR value is reduced, decreasing the probability of an erroneous rejection of a voice command. This adjustment can be retained for the states 101–104, which follow the idle state 100. Dynamically setting the FAR value and FRR value based upon the operating state of the speech recognition system reduces the probability of improper execution of voice commands, and increases the system operating convenience.

Although the present invention has been shown and described with respect to several preferred embodiments thereof, various changes, omissions and additions to the form and detail thereof, may be made therein, without departing from the spirit and scope of the invention.

What is claimed is:

1. A speech recognition unit, comprising:
    a memory device that includes an executable speech recognition routine; and
    a processor that receives and executes program instructions associated with said executable speech recognition routine, wherein
    in a first operating state said processor regularly receives a digitized audio signal and processes said digitized audio signal to determine, using first detection criteria, if a keyword is embedded as data within said digitized audio signal, and upon detection of said keyword said processor transitions to operate in a second operating state,
    in said second operating state said processor regularly receives and processes said digitized audio signal to determine, using a second detection criteria, if a first voice command is embedded as data within said digitized audio signal, wherein said first detection criteria provides a greater false rejection rate than said second detection criteria.

2. The speech recognition unit of claim 1, wherein upon detection of said first voice command said processor transitions to operate in a third state, wherein in said third state said processor regularly receives and processes said digitized audio signal to determine, using said second detection criteria, if a second voice command is embedded as data within said digitized audio signal.

3. The speech recognition unit of claim 2, wherein upon detection of said second voice command said processor transitions to operate in a fourth state, wherein in said fourth state said processor regularly receives and processes said digitized audio signal to determine, using said second detection criteria, if a termination command is embedded as data within said digitized audio signal.

4. The speech recognition unit of claim 3, wherein upon detection of said termination command said processor transitions from said fourth operating state to said first operating state.

5. The speech recognition unit of claim 4, wherein said processor processes said second command signal to determine if said second command signal represents the completion of a command sequence, wherein if said second command signal does represent the completion of the command sequence said processor returns to said first operating state.

6. The speech recognition unit of claim 5, wherein said processor comprises a microprocessor.

7. The speech recognition unit of claim 6, wherein in response to detecting said first command signal said processor provides an output signal to control a device associated with said speech recognition unit.

8. A speech recognition unit that provides a command signal to a controlled device in response to voice commands, said speech recognition unit comprising:

a memory device that includes an executable speech recognition routine; and a processor that receives and executes program instructions associated with said executable speech recognition routine to control the operating state of said speech recognition unit, wherein said program instructions include first means for operating said speech recognition unit in a first operating state, wherein said processor regularly receives a digitized audio signal and processes said digitized audio signal to determine, using first detection criteria, if a keyword is within said digitized audio signal, and upon detection of said keyword said processor transitions to operate in a second operating state, second means for operating said speech recognition unit in a second operating state, wherein said processor regularly receives and processes said digitized audio signal to determine, using a second detection criteria, if a first voice command is within said digitized audio signal, wherein said first detection criteria provides a greater false rejection rate than said second detection criteria.

9. The speech recognition unit of claim 8, wherein upon detection of said first voice command said processor transitions to operate in a third state, wherein said program instructions include third means for operating said speech recognition unit in a third operating state, wherein said processor regularly receives and processes said digitized audio signal to determine, using said second detection criteria, if a second voice command is embedded as data within said digitized audio signal.

10. The speech recognition unit of claim 9, wherein upon detection of said second voice command said processor transitions to operate in a fourth state, wherein said program instructions include fourth means for operating said speech recognition unit in a fourth operating state, wherein said processor regularly receives and processes said digitized audio signal to determine, using said second detection criteria, if a termination command is embedded as data within said digitized audio signal.

11. The speech recognition unit of claim 10, wherein upon detection of said termination command said processor transitions from said fourth operating state to said first operating state.

12. The speech recognition unit of claim 11, wherein said executable program instructions include means for processing said second command signal to determine if said second command signal represents the completion of a command sequence, wherein if said second command signal represents the completion of the command sequence said processor returns to said first operating state.

13. The speech recognition unit of claim 12, wherein said processor comprises a microprocessor.

14. The speech recognition unit of claim 13, wherein in response to detecting said first command signal said processor provides an output signal to control a device associated with said speech recognition unit.

15. A voice recognition apparatus, comprising:

sound detection means for detecting an audio signal, and for providing a received audio signal indicative thereof;

speech recognition means for recognizing a voice command contained in said received audio signal, and for converting the recognized voice command into an appropriate control signal for a device, wherein said speech recognition means is designed such that it performs speech recognition in the form of a predefined sequence of states and, upon detection of an appropriate voice command, changes from a first state to a second state, said speech recognition means performs its speech recognition function in each state in accordance with at least one speech recognition detection parameter, characterized in that at least one speech recognition detection parameter is set to different values for the individual states such that the second state has a greater false acceptance rate than the first state.

* * * * *